(12) United States Patent
Kato

(10) Patent No.: US 9,975,703 B2
(45) Date of Patent: May 22, 2018

(54) CONVEYING DEVICE

(71) Applicant: Techno Dynamics Inc., Kikugawa-shi, Shizouka (JP)

(72) Inventor: Toshinao Kato, Kikugawa (JP)

(73) Assignee: Techno Dynamics Inc., Kikugawa-shi, Shizuoka (JP)

( * ) Notice: Subject to any disclaimer, the term of this patent is extended or adjusted under 35 U.S.C. 154(b) by 0 days. days.

(21) Appl. No.: 15/589,083

(22) Filed: May 8, 2017

(65) Prior Publication Data

US 2017/0327319 A1  Nov. 16, 2017

(30) Foreign Application Priority Data

May 13, 2016  (JP) .................. 2016-096936

(51) Int. Cl.
| | |
|---|---|
| *B65G 33/06* | (2006.01) |
| *B65G 35/08* | (2006.01) |
| *B65G 33/04* | (2006.01) |
| *B65G 35/06* | (2006.01) |

(52) U.S. Cl.
CPC .......... *B65G 33/06* (2013.01); *B65G 35/066* (2013.01); *B65G 35/08* (2013.01); *B65G 33/04* (2013.01); *B65G 2812/05* (2013.01)

(58) Field of Classification Search
CPC ...... B65G 33/06; B65G 35/066; B65G 35/08; B65G 2812/05; B65G 33/04
USPC .................................................... 198/467.1
See application file for complete search history.

(56) References Cited

U.S. PATENT DOCUMENTS

| | | | | |
|---|---|---|---|---|
| 1,347,215 | A | | 7/1920 | Eby |
| 2,752,883 | A | * | 7/1956 | Curtis .................. B61B 10/025 |
| | | | | 104/166 |
| 3,036,624 | A | * | 5/1962 | Carter ..................... B65B 35/26 |
| | | | | 156/566 |
| 3,811,385 | A | * | 5/1974 | Johnson ................ B61B 12/105 |
| | | | | 104/167 |

(Continued)

FOREIGN PATENT DOCUMENTS

| | | |
|---|---|---|
| DE | 102011016467 A1 | 10/2012 |
| EP | 1464593 | 10/2004 |
| JP | 2010-285248 | 12/2010 |

OTHER PUBLICATIONS

Extended European Search Report for parallel application EP 17169578.6, EPO, Munich, dated Oct. 19, 2017.

*Primary Examiner* — Douglas A Hess

(74) *Attorney, Agent, or Firm* — Harness, Dickey & Pierce, P.L.C.

(57) ABSTRACT

The present invention is characterized to include a carrier to which an object to be carried is installed, a moving path where a plurality of the carriers respectively move in uncoupled states, a conveying part that comes into contact with the carrier to directly move the carrier and that makes a contacted carrier that had come into contact and been moved push a plurality of carriers that are positioned in front of the contacted carrier to indirectly move the plurality of carriers, and a cylindrical cam that possesses an engaging groove and that is provided to correspond to only a part of the moving path, wherein the cylindrical cam rotates to move the plurality of the carriers that are pushed by the contacted carrier to reach the cylindrical cam and that are engaged with the engaging groove, and changes an interval between the plurality of carriers as well.

4 Claims, 10 Drawing Sheets

(56) References Cited

U.S. PATENT DOCUMENTS

| | | | | |
|---|---|---|---|---|
| 3,842,961 | A * | 10/1974 | Burson | B66B 23/26 |
| | | | | 104/167 |
| 4,615,274 | A | 10/1986 | Hoehn | |
| 5,359,834 | A * | 11/1994 | Holdensgaard | B65G 23/32 |
| | | | | 198/465.1 |
| 7,374,392 | B2 * | 5/2008 | Biondi | B65G 33/04 |
| | | | | 198/467.1 |
| 7,946,411 | B2 * | 5/2011 | Gonzalez Alemany | |
| | | | | B66B 23/04 |
| | | | | 198/334 |
| 8,272,500 | B2 * | 9/2012 | Nishikawa | B65G 35/066 |
| | | | | 198/465.1 |
| 9,027,743 | B2 * | 5/2015 | Schulakow-Klass | B65G 35/08 |
| | | | | 198/795 |
| 9,382,074 | B2 * | 7/2016 | Nishikawa | B65G 35/066 |
| 9,434,548 | B2 * | 9/2016 | Brunee | B65G 19/02 |
| 9,766,258 | B2 * | 9/2017 | Itoh | B65G 54/02 |
| 9,802,766 | B2 * | 10/2017 | Ookada | B65G 35/066 |
| 2014/0021016 | A1 | 1/2014 | Schulakow- Klass et al. | |
| 2014/0048386 | A1 | 2/2014 | Brunee | |

\* cited by examiner

CONVEYING DEVICE

CROSS-REFERENCE TO RELATED APPLICATION

The present application claims priority pursuant to 35 U.S.C. § 119 from Japanese patent application No. 2016-96936, filed on May 13, 2016, the entire disclosure of which is hereby incorporated herein by reference.

BACKGROUND

Technical Field

The present invention relates to a conveying device.

Related Art

A conveying device that conveys objects to be conveyed is already well known. Conventionally, devices that utilize chain links had been used as this conveying device. In other words, this conveying device has a plurality of installation parts to which each of the objects to be conveyed are installed and these plurality of installation parts are coupled with chains. (Japanese Patent Application Laid-open Publication No. 2010-285248)

In a conventional conveying device, a plurality of the installation parts were coupled with a chain so that the objects to be conveyed were conveyed without changing (always keeping constant) the intervals between the installation parts (objects to be transferred). Therefore, a request to change the interval between the installation parts at only a part of the moving path could not be satisfied even when there were such requests. As an example, it is desirable to further widen the interval between the installation parts to avoid light interference caused by illumination from occurring when images of the objects to be conveyed are taken, however, such requests could not be satisfied.

SUMMARY OF INVENTION

The present invention has been made in view of conventional problems such as that described above and an objective thereof is to provide a conveying device that can realize various kinds of conveying.

An aspect of the invention to achieve the above advantage is, a conveying device including
  a carrier to which an object to be carried is installed,
  a moving path where a plurality of the carriers respectively move in uncoupled states,
  a conveying part that comes into contact with the carrier to directly move the carrier and that makes a contacted carrier that had come into contact and been moved push a plurality of carriers that are positioned in front of the contacted carrier to indirectly move the plurality of carriers, and
  a cylindrical cam that possesses an engaging groove and that is provided to correspond to only a part of the moving path, wherein the cylindrical cam rotates to move the plurality of the carriers that are pushed by the contacted carrier to reach the cylindrical cam and that are engaged with the engaging groove, and changes an interval between the plurality of carriers as well.

Features of the present invention other than the above will become clear from the description of the present specification with reference to the accompanying drawings.

BRIEF DESCRIPTION OF DRAWINGS

For a more complete understanding of the present invention and the advantages thereof, reference is now made to the following description taken in conjunction with the accompanying drawings wherein.

DESCRIPTION OF EMBODIMENTS

Figure 1:
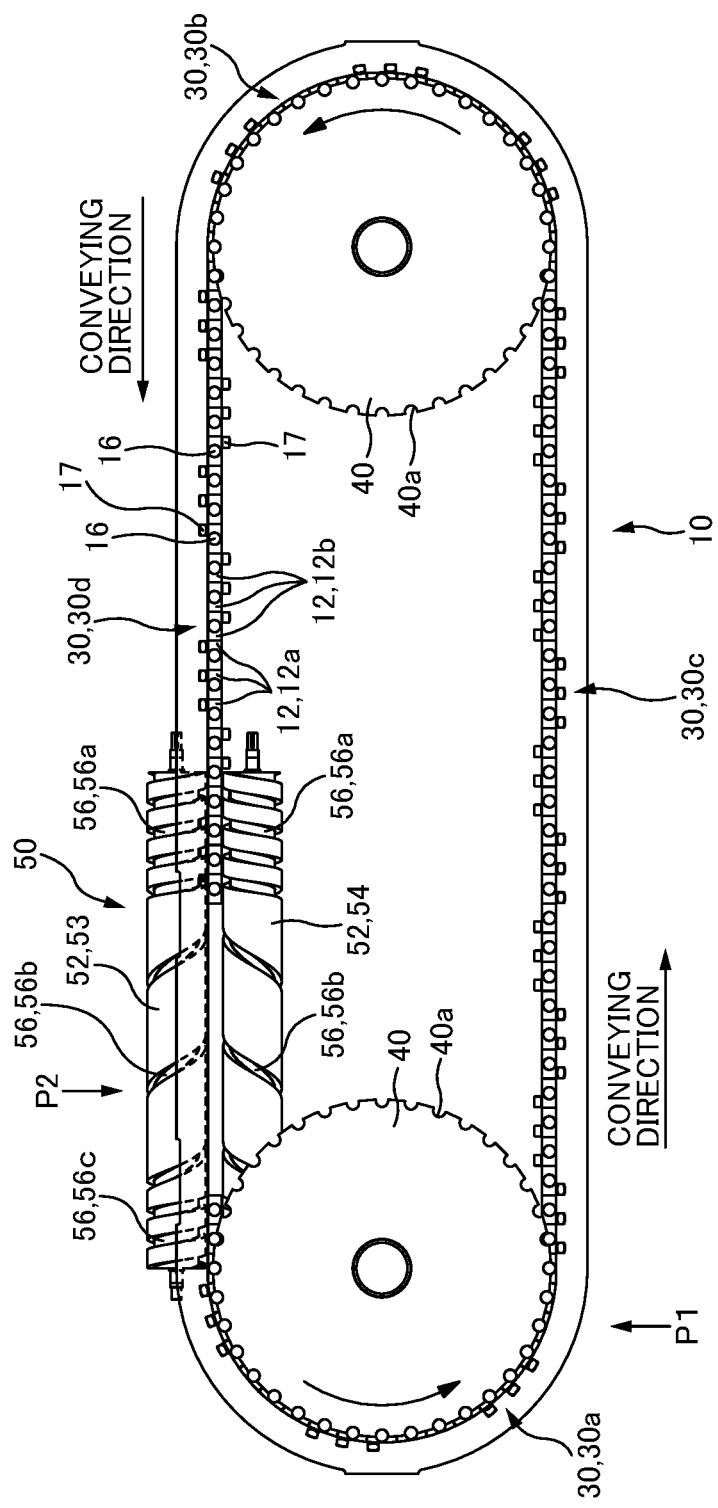
FIG. 1 is a diagram showing the entire conveying device 10.

At least the following matters will become clear with the description of this specification and the accompanying drawings.

A conveying device including
  a carrier to which an object to be carried is installed,
  a moving path where a plurality of the carriers respectively move in uncoupled states,
  a conveying part that comes into contact with the carrier to directly move the carrier and that makes a contacted carrier that had come into contact and been moved push a plurality of carriers that are positioned in front of the contacted carrier to indirectly move the plurality of carriers, and
  a cylindrical cam that possesses an engaging groove and that is provided to correspond to only apart of the moving path, wherein the cylindrical cam rotates to move the plurality of the carriers that are pushed by the contacted carrier to reach the cylindrical cam and that are engaged with the engaging groove, and changes an interval between the plurality of carriers as well.

According to such a conveying device, a conveying device that can carry out various kinds of conveying can be realized.

The conveying device may have the cylindrical cam stop when the interval between the plurality of carriers is changed.

According to such a conveying device, a conveying device that can carry out further various kinds of conveying can be realized.

The conveying device may have a first cylindrical cam and a second cylindrical cam that are respectively provided to correspond to predetermined positions on the moving path, included as the cylindrical cam,
  the engaging grooves of the first cylindrical cam and the second cylindrical cam be helical grooves and respectively include a first groove part and a second groove part that is continuous with the first groove part, is positioned on a downstream side in a conveying direction with respect to the first groove part and has a pitch that is different from the pitch of the first groove part, a first carrier that is engageable with only the engaging groove of the first cylindrical cam and a second carrier that is engageable with only the engaging groove of the second cylindrical cam included as the carriers, the carriers move in the moving path in states where a set of a plurality of the first carriers and a set of a plurality of the second carriers are alternately lined up, the first cylindrical cam stop when the interval of the first carriers is changed by the first cylindrical cam rotating to move the set of the plurality of the first carriers past the first groove part to reach the second groove part, and the second cylindrical cam rotate to move the second carriers that reached the first groove part, when the first cylindrical cam is stopped.

According to such a conveying device, a conveying device that can carry out even further various kinds of conveying can be realized.

The conveying device may further have a drive source to drive the cylindrical cam and a cam unit that includes the cylindrical cam and the drive source detachably provided to the conveying device.

According to such a conveying device, the flexibility of the conveying device can be improved.

Conveying Device 10 According to an Embodiment

Configuration examples of the conveying device 10 that conveys objects to be conveyed will be described here with reference to FIGS. 1 to 6E.

Figure 2:
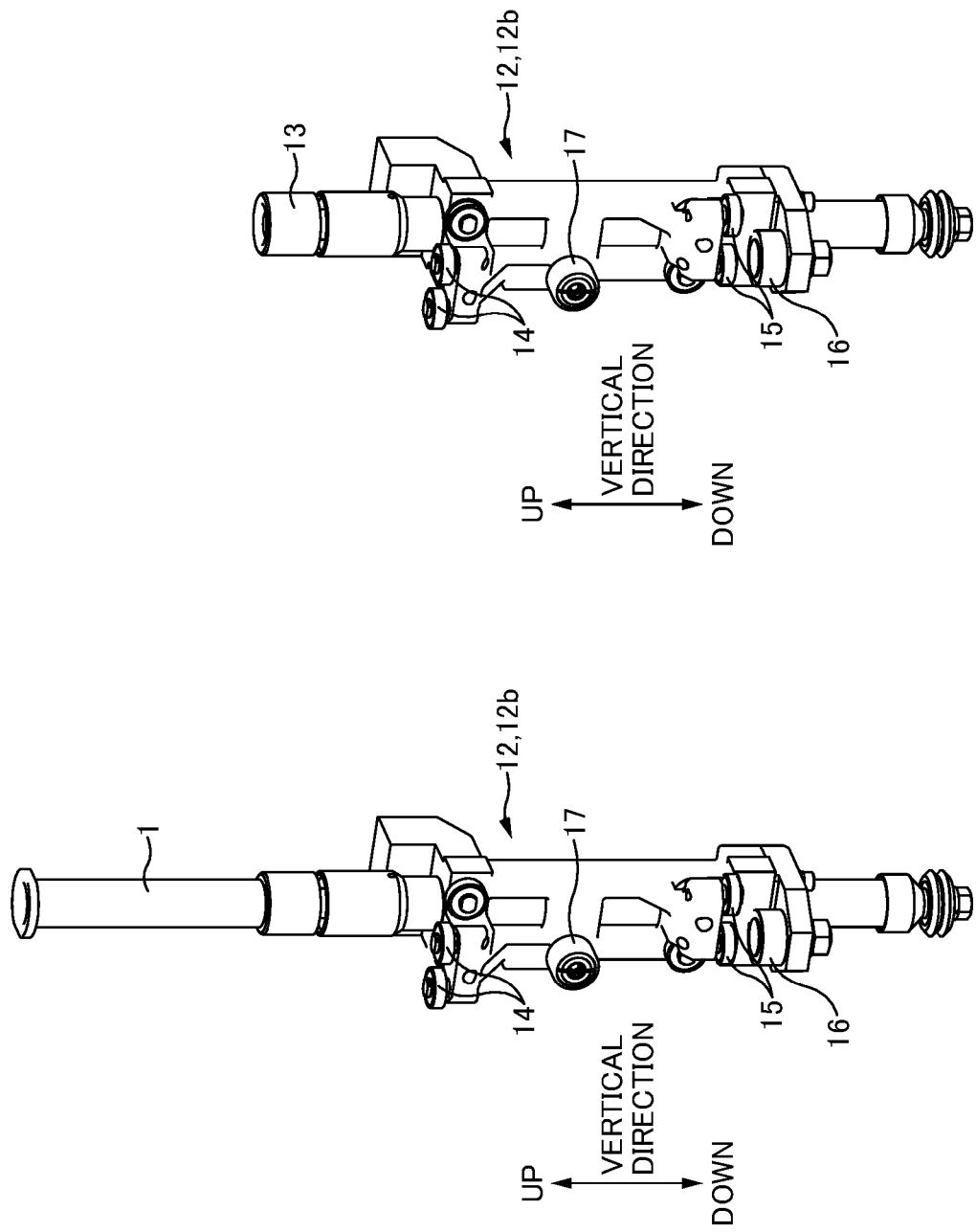
FIG. 2 is diagram illustrating a perspective view of carriers 12.
Figure 3:
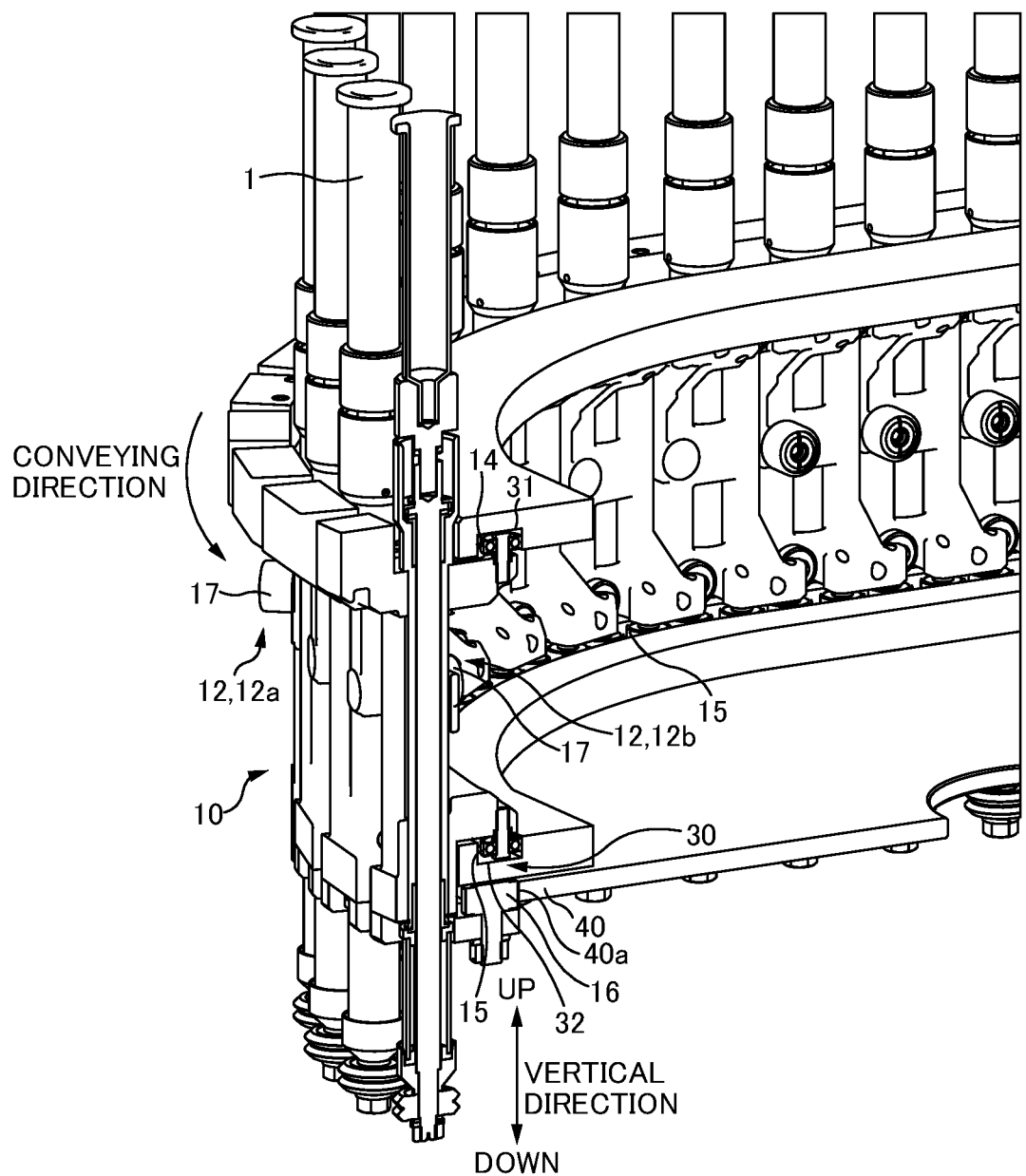
FIG. 3 is a diagram showing a perspective view of how the carriers 12 move along the moving path 30.
Figure 4:
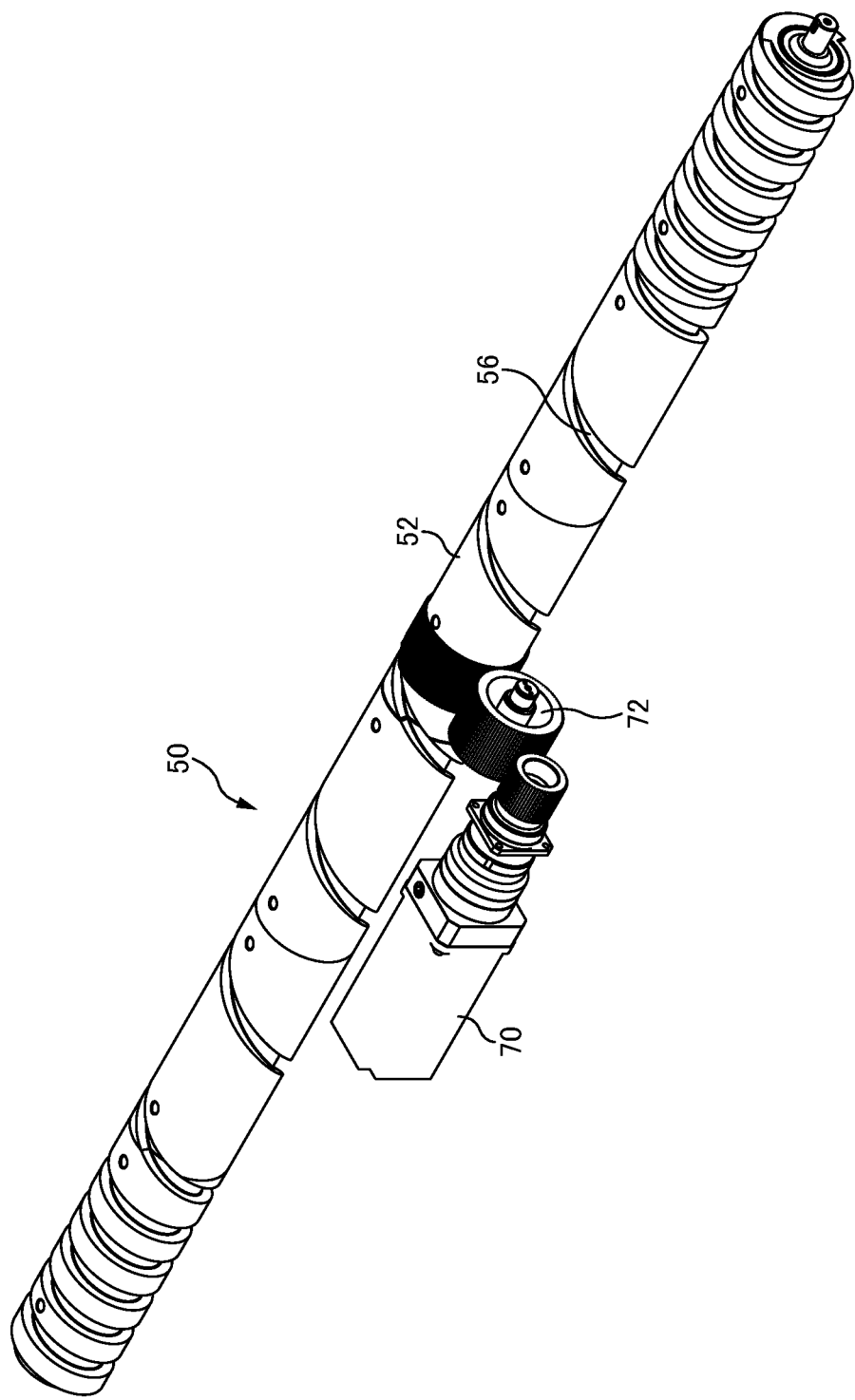
FIG. 4 is a diagram showing a perspective view of a cam unit 50.

FIG. 1 is a diagram illustrating the entire view of the conveying device 10. FIG. 2 is diagram illustrating a perspective view of the carriers 12 and the left diagram illustrates a state when the syringe 1 is attached and the right diagram illustrates a state when the syringe 1 is not attached. FIG. 3 is a diagram showing a perspective view of how carriers 12 (first carriers 12a and second carriers 12b) move along the moving path 30. FIG. 4 is a diagram showing a perspective view of the cam unit 50. Description of FIGS. 5 to 6E will be given later.

The carriers 12 indicated in FIG. 2 are the second carriers 12b of the later described first and the second carriers 12a, 12b. And as described later, the carriers 12 in the present embodiment move in the moving path 30 with a set including a plurality (N) of the first carriers 12a and a set including a plurality (N) of the second carriers 12b alternately lined up, however, the number (i.e., value of N) of the carriers 12 belonging to the respective sets is arbitrary. And the cylindrical cams 52 (first cylindrical cam 53 and second cylindrical cam 54) are prepared in accordance with the number of (value of N) of the carriers 12. Description in the present embodiment is given assuming that the number (value of N) of the carriers 12 is three, however, only FIG. 4 indicates the cylindrical cam 52 that corresponds to the case when the number (value of N) of the carriers 12 is six, for the sake of convenience.

The conveying device 10 according to the present embodiment is a device that conveys empty or drug solution filled injection syringes (commonly called syringe 1). This conveying device 10 includes a plurality of (many) carriers 12, a moving path 30, two revolving conveying parts 40 (corresponding to conveying part), a cam unit 50 and a controller (not shown) that controls such.

A carrier 12 (also called moving table) has the syringe 1 that serves as the object to be conveyed installed thereto and the carrier 12 conveys this syringe 1 by moving along the moving path 30.

The moving path 30 is a path on which each of the plurality of carriers 12 moves on. The moving path 30 in the present embodiment includes two curved paths (first curved path 30a and second curved path 30b) and two linear paths (first linear path 30c and second linear path 30d) that connect the curved paths. In other words, a single circuit of the moving path 30 is configured with the two curved paths and two linear paths. And the carriers 12 are made to repetitively move (circulate) in the order of the first curved path 30a, the first linear path 30c, the second curved path 30b, the second linear path 30d, the first curved path 30a and so on. Further, each of the carriers 12 are independent of each other and are not coupled. In other words, each of the plurality of carriers 12 moves in an uncoupled state.

And the moving path 30 has an upper guide groove 31 and a lower guide groove 32 provided to the entire circumference (see FIG. 3). Meanwhile, a carrier 12 has two of each of the upper rollers 14 and the lower rollers 15 provided, as illustrated in FIGS. 2 and 3. And the upper and the lower rollers 14, 15 are rotatable rollers that are positioned in the upper guide groove 31 and the lower guide groove 32. And the upper rollers 14 and the lower rollers 15 respectively rotate and move along the upper guide groove 31 and the lower guide groove 32 so to thereby allow the carriers 12 to be guided by the guide grooves and moved along the moving path 30.

The places in the moving path 30 indicated in FIG. 1 respectively have provided thereto an attaching position P1 for attaching the syringe 1 to the carrier 12 and a detaching position P2 for detaching the syringe 1 from the carrier 12. The uppermost part of the carrier 12 has provided thereto an attaching part 13 for attaching the syringe 1, as illustrated in FIG. 2. And the syringe 1 is attached to the attaching part 13 of the carrier 12 at the attaching position P1. And when this carrier 12 (syringe 1) is conveyed, the carrier 12 (syringe 1) eventually reaches the detaching position P2. Then the syringe 1 is detached from the attaching part 13 at the detaching position P2. Here in the present embodiment, the syringe 1 is exposed to light for the syringe 1 to be taken an image with a camera at the detaching position P2 before the syringe 1 is detached from the carrier 12. For such reason, the detaching position P2 also serves as the shooting position where the syringe 1 is taken an image with a camera.

Here, the carrier 12 can have only one syringe 1 attached. Therefore, the movement of a single carrier 12 allows a single syringe 1 to be conveyed.

Next, a method of conveying the carriers 12 will be described. The carriers 12 according to the present embodiment are conveyed by three types of methods. Firstly, the carriers 12 are directly conveyed with the revolving conveying parts 40 (first conveying method).

A revolving conveying part 40 is each provided to correspond to the first curved path 30a and the second curved path 30b (i.e., there is a total of two revolving conveying parts 40). And the carriers 12 that are positioned at the curved paths are conveyed in response to the rotation of the revolving conveying parts 40 that are imparted a driving force from a non-illustrated drive source. The outer peripheral edges of the revolving conveying parts 40 have recessed parts 40a that are provided evenly spaced apart, as illustrated in FIG. 1. Meanwhile, an engaging part 16 that engages with the recessed part 40a is provided to the lower part of the carrier 12, as illustrated in FIGS. 2 and 3. When a carrier 12 reaches the revolving conveying part 40 (curved path), this engaging part 16 engages with the recessed part 40a and then the carrier 12 is pushed by the revolving conveying part 40 so that the carrier 12 is conveyed (moved) along the circumferential direction.

In this way, the revolving conveying parts 40 contact the carriers 12 to directly move the carrier 12. However, in addition, the revolving conveying parts 40 also serve roles of indirectly moving a plurality of carriers 12 by the contacted and moved carriers 12 (called contacted carriers) pushing the plurality of carriers 12 that are positioned in front of the above carriers 12 (contacted carriers). In other words, the carriers 12 that have been conveyed by the revolving conveying parts 40 would eventually reach the linear path to be disengaged from the revolving conveying parts 40 such that these carriers 12 would not be imparted a force for moving by the revolving conveying part 40. However, these carriers 12 would be conveyed in the conveying direction by being pushed from behind by the carriers 12 that are located behind and that are engaged with the revolving conveying parts 40 (second conveying method).

The aforementioned indirect conveying by the revolving conveying part 40 that is positioned at the first curved path 30a allows the carriers 12 along the first linear path 30c to eventually reach the second curved path 30b. Then such carriers 12 would be directly conveyed by the revolving conveying part 40 that is positioned at the second curved path 30b. Thereafter, when these carriers 12 leave the revolving conveying part 40 that is positioned at the second curved path 30b, these carriers 12 are indirectly conveyed by this revolving conveying part 40 such that these carriers 12 eventually reach the cam unit 50 (cylindrical cams 52). Then this time, the carriers 12 would be conveyed by the cam unit 50 (cylindrical cams 52) (third conveying method).

The cam unit 50 includes two cylindrical cams 52 (first cylindrical cam 53 and second cylindrical cam 54), a drive source 70 (a first drive source that drives the first cylindrical cam 53 and a second drive source that drives the second cylindrical cam 54, i.e., a total of two) such as a motor that is provided to correspond to the respective cylindrical cams 52 to drive the cylindrical cams 52, and an intermediate gear 72 (first intermediate gear and second intermediate gear, i.e., a total of two) that is provided between the drive source 70 and the cylindrical cams 52. And the cylindrical cams 52 are imparted the drive force from the drive source 70 via the intermediate gear 72 to rotate.

Here, the cam unit 50 is detachably provided to the conveying device 10 (moving path 30). In other words, the cam unit 50 is not attached to be permanently fixed to the conveying device 10 but is configured such that the cam unit 50 can be freely detached and easily attached to a different place by a user.

The cylindrical cams 52 are provided to correspond to the moving path 30. Particularly in the present embodiment, the length of the cylindrical cams 52 in the lengthwise direction is shorter than the length of the moving path 30 such that the cylindrical cams 52 are provided to correspond (specifically, correspond to the aforementioned detaching position P2) to only a part (and not the entire part) of the moving path 30. Further, the first cylindrical cam 53 and the second cylindrical cam 54 are respectively provided to correspond to the predetermined position along the moving path 30, that is, the same position along the moving path 30. As illustrated in FIG. 1, the first cylindrical cam 53 is provided on the outer side of the moving path 30 and the second cylindrical cam 54 is provided on the inner side of the moving path 30.

The cylindrical cams 52, by rotating, move the plurality of carriers 12 that reached the cylindrical cams 52 by being pushed by the carriers 12 (contact carriers) while the plurality of carriers 12 are engaged with the engaging groove 56. In other words, the cylindrical cams 52 respectively possesses a helical engaging groove 56 and meanwhile, a cam follower 17 that engages with the engaging groove 56 is provided to a vertical center part of the carrier 12. And when the carrier 12 reaches the cylindrical cam 52, this cam follower 17 engages with the helical engaging groove 56 such that the carriers 12 are conveyed in the conveying direction with the rotation of the cylindrical cam 52.

Further, the cylindrical cams 52 move the plurality of carriers 12 that reached the cylindrical cams 52 by being pushed by the carriers 12 (contact carriers) while the plurality of carriers 12 are engaged with the engaging groove 56 and change the intervals of the plurality of carriers 12 (widens the intervals in the present embodiment) as well. In other words, the engaging groove 56 of each cylindrical cam 52 includes a first groove part 56a and a second groove part 56b that is continuous with this first groove part 56a, is positioned on the downstream side in the conveying direction with respect to this first groove part 56a and further has a pitch different from the first groove part 56a (specifically, a pitch larger than that of the first groove part 56a). And when the plurality of carriers 12 move past the first groove part 56a to reach the second groove part 56b with the rotation of the cylindrical cams 52, the intervals of the plurality of carriers 12 are changed (widened). Further, in the present embodiment, a third groove part 56c being continuous with the second groove part 56b and having a pitch that is similar to that of the first groove part 56a is positioned on the downstream side in the conveying direction with respect to the second groove part 56b.

And in the present embodiment, two types of carriers (called first carrier 12a and second carrier 12b) are provided as the carriers 12. The first carriers 12a are engageable only with the engaging groove 56 of the first cylindrical cam 53 and the second carriers 12b are engageable only with the engaging groove 56 of the second cylindrical cam 54. In other words, the first cylindrical cam 53 is provided with an engaging groove 56 with which only the first carrier 12a can engage and the second cylindrical cam 54 is provided with an engaging groove 56 with which only the second carrier 12b can engage. That is, in a second carrier 12b, the cam follower 17 is attached to the face where the upper roller 14, the lower roller 15 and the engaging part 16 are provided, and in a first carrier 12a, the cam follower 17 is attached to the face (back face) on the opposite side of the face where the upper roller 14, the lower roller 15 and the engaging part 16 are provided. In other words, as illustrated in FIG. 1, the first carrier 12a has attached thereto the cam follower 17 to face the outer side of the moving path 30 and the second carrier 12b has attached thereto the cam follower 17 to face the inner side of the moving path 30. Therefore, the first carriers 12a engage with only the first cylindrical cam 53 and the second carriers 12b engage with only the second cylindrical cam 54.

And as illustrated in FIG. 1, these carriers 12 are mounted to the moving path 30 such that a set of a plurality (three) of first carriers 12a and a set of a plurality (three) of second carriers 12b are lined up alternately. In other words, the carriers 12 would move along the moving path 30 in a state where the set of the plurality (three) of first carriers 12a (hereinafter called first carrier set for the sake of convenience) and the set of the plurality (three) of second carriers 12b (hereinafter called second carrier set for the sake of convenience) are lined up alternately.

Figure 5:
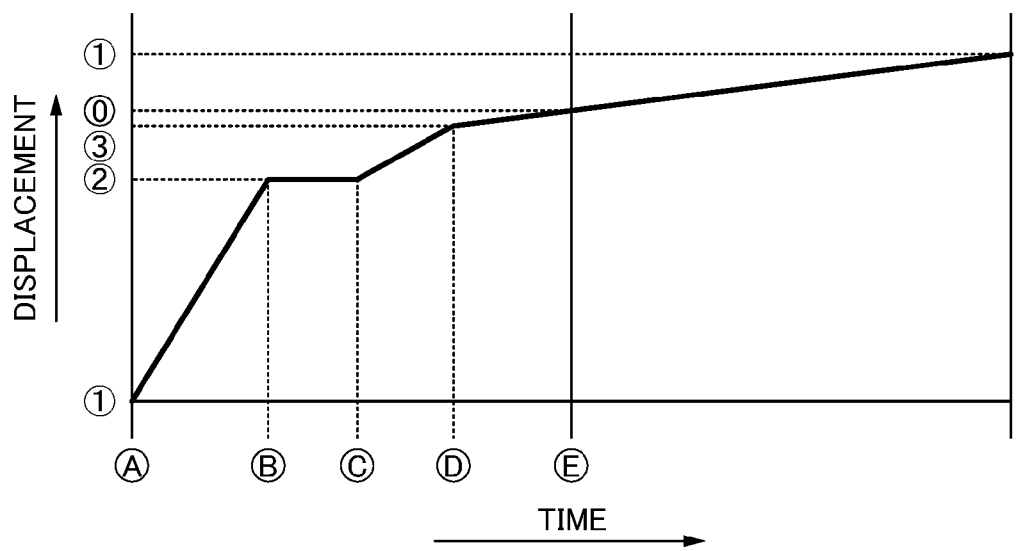
FIG. 5 is a timing diagram of the cylindrical cam 52.
Figure 5:
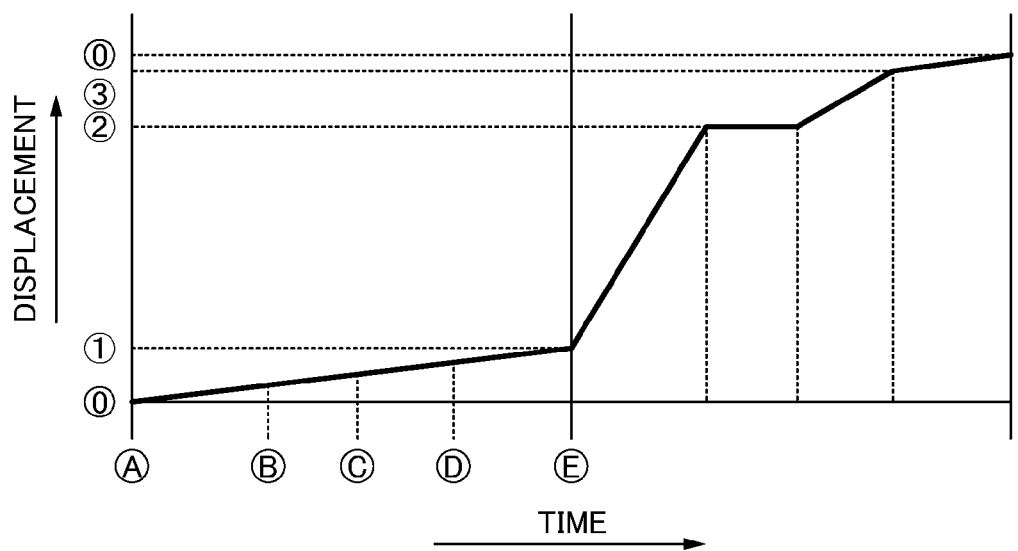
Figure 6A:
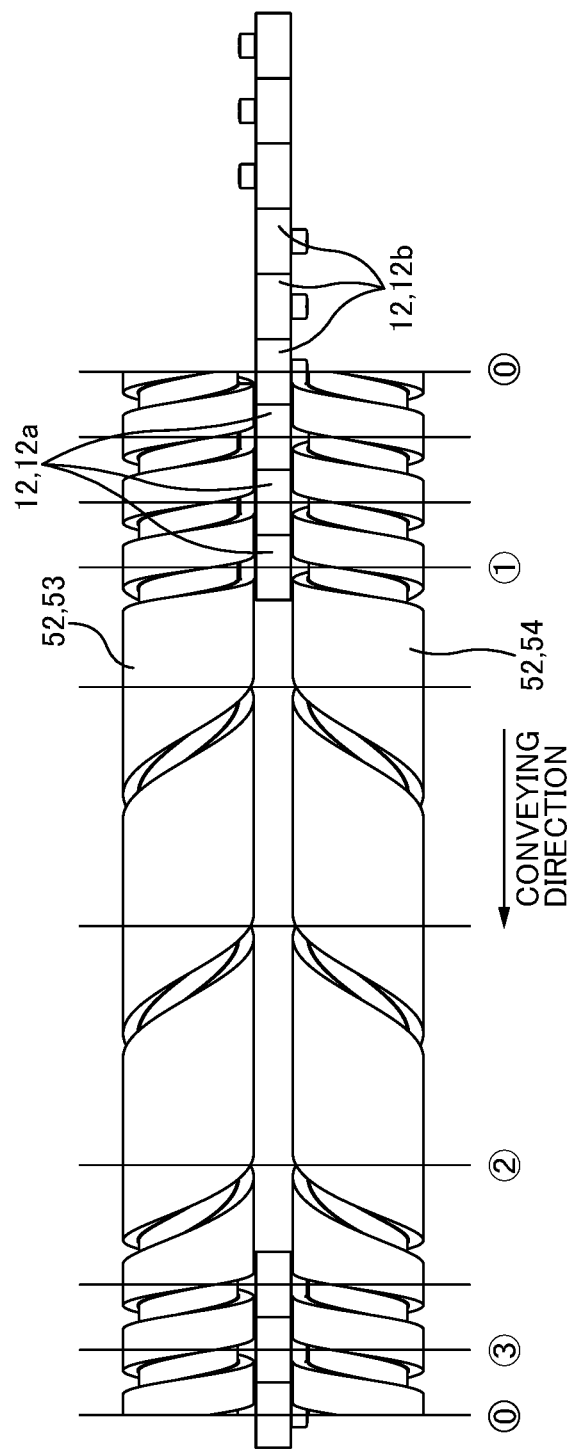
FIG. 6A is a diagram showing a condition of the carrier 12 at a timing A in FIG. 5.
Figure 6B:
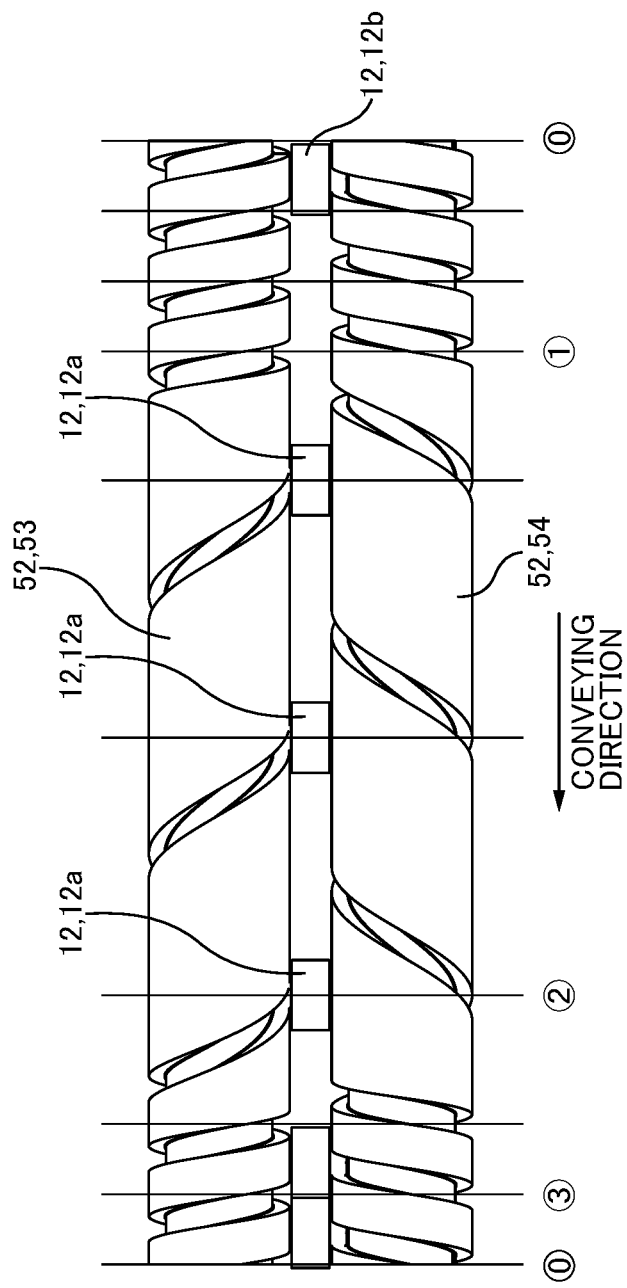
FIG. 6B is a diagram showing a condition of the carrier 12 at a timing B in FIG. 5.
Figure 6C:
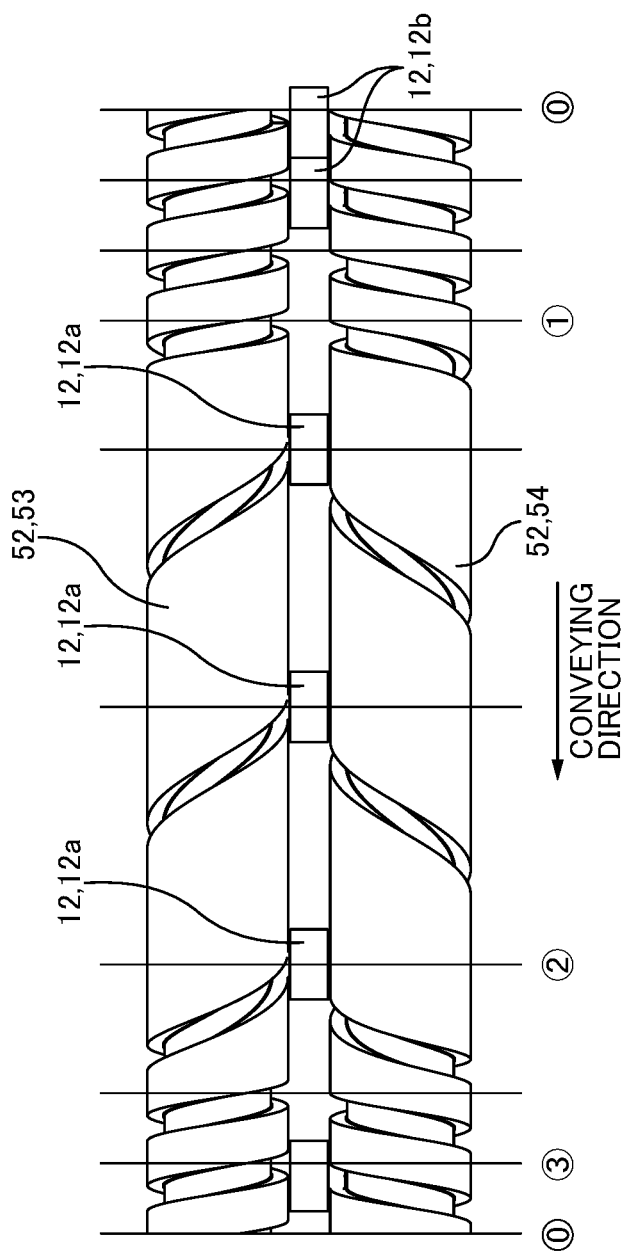
FIG. 6C is a diagram showing a condition of the carrier 12 at a timing C in FIG. 5.
Figure 6D:
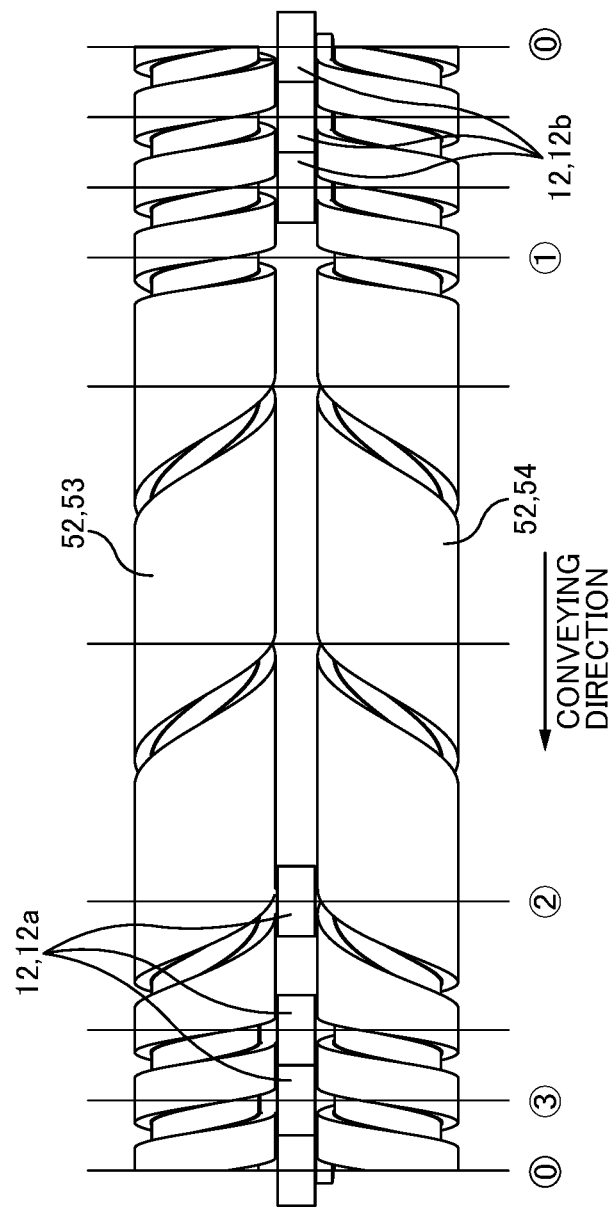
FIG. 6D is a diagram showing a condition of the carrier 12 at a timing D in FIG. 5.
Figure 6E:
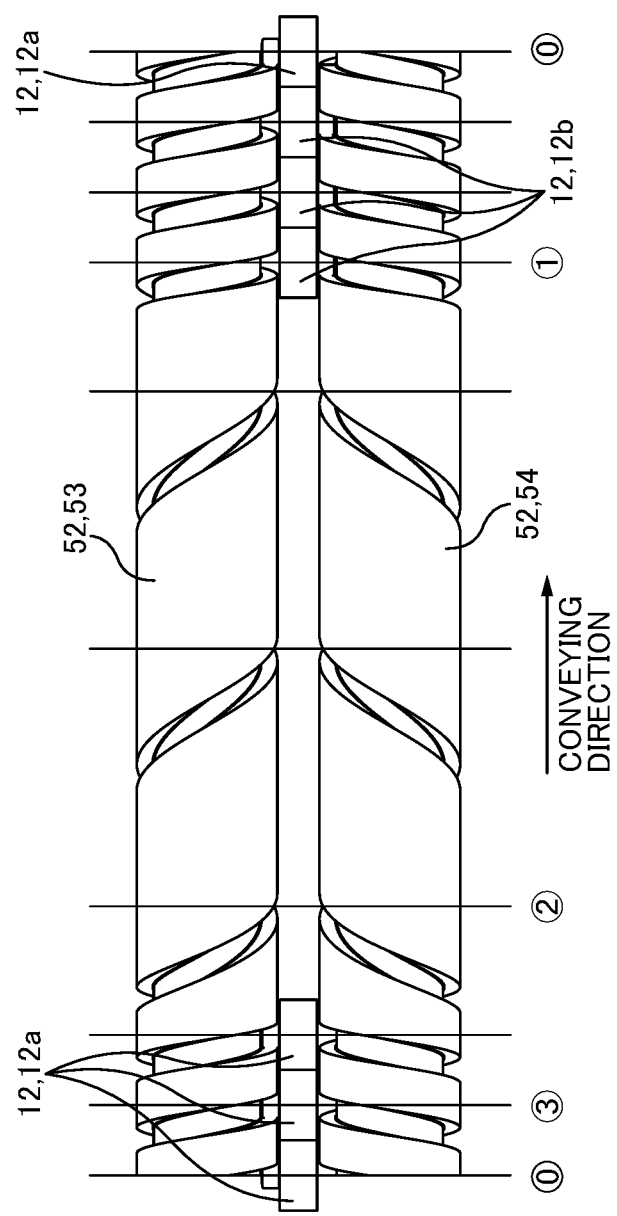
FIG. 6E is a diagram showing a condition of the carrier 12 at a timing E in FIG. 5.

The following gives a description of how the carriers 12 are conveyed with the cylindrical cams 52 with reference to FIGS. 5 to 6E. FIG. 5 is a timing diagram of the cylindrical cams 52 and the upper figure illustrates the timing diagram of the first cylindrical cam 53 and the lower figure illustrates the timing diagram of the second cylindrical cam 54. FIGS. 6A to 6E are diagrams showing the conditions of the carriers 12 at the respective timings A to E in FIG. 5.

In FIG. 6A, the position of the first carrier set is at position 1 and the position of the second carrier set that is subsequent to the first carrier set is at position 0. Here, in this specification, the position of the carrier set means the position of the head carrier of this carrier set. Further, the position 0, position 1 and the like are indicated with the circled numerals in FIGS. 5 to 6E.

When the first cylindrical cam 53 and the second cylindrical cam 54 rotate from the state illustrated in FIG. 6A, the first carrier set and the second carrier set eventually move to the state illustrated in FIG. 6B. That is, the first carrier set moves past the first groove part 56a to reach the second groove part 56b with the rotation of the first cylindrical cam 53. And hereby, the intervals between the three first carriers 12a are changed (widened). Meanwhile, the second carrier set would move slightly in the conveying direction, but not reaching the position 1, with the rotation of the second cylindrical cam 54.

When the state illustrated in FIG. 6B is reached, the first cylindrical cam 53 stops for a predetermined time, until the state illustrated in FIG. 6C is reached. That is, the first cylindrical cam 53 stops once when the intervals of the three first carriers 12a are changed (widened). Therefore, the moving of the three first carriers 12a is also once stopped at this state.

In the present embodiment, three syringes 1 are taken images using three non-illustrated lightings and three non-illustrated cameras that correspond to the respective ones of the three syringes 1 at this stopped timing. In other words, in the present embodiment, the reason for widening the intervals between the three first carriers 12a was for the respective lightings to illuminate only the syringe 1 that corresponds thereto. In other words, the widening of the intervals was carried out to keep light interference from occurring by the light illuminating not only the corresponding syringe 1 but the syringe 1 that is positioned adjacent to this corresponding syringe 1. And additionally, the reason for stopping the three first carriers 12a (first cylindrical cam 53) was in order to take the images with the camera without the images blurring. However, such reason is not limited to those given above and other reasons may do. For example, the reason may be for carrying out a fabrication with a fabrication member for fabricating the object to be conveyed smoothly without intervention.

Meanwhile, the second cylindrical cam 54 rotates to move the second carriers 12b that have reached the first groove part 56a also when the first cylindrical cam 53 (three first carriers 12a) is stopped (i.e., when the intervals between the three first carriers 12a are changed (widened)). Therefore, the second carrier set would move slightly in the conveying direction, but not reaching the position 1, with the rotation of the second cylindrical cam 54.

In the present embodiment, the conveying device 10 is contained inside a sterile isolator (un-illustrated isolator that is designed to eliminate bacteria as much as possible). Therefore, it is preferable that the conveying of the carriers 12 is stopped at a minimum. This is because the risk of dust and particles such as bacteria and the like sticking to the syringe 1 (the bacteria would develop when the particles are bacteria) may increase when the carriers 12 remain stopped inside the sterile isolator. Therefore, such an issue can be restrained from occurring by continuing to convey the second carriers 12b by rotating the second cylindrical cam 54 also when the first cylindrical cam 53 is (three first carriers 12a are) stopped. The reason for keeping the second cylindrical cam 54 rotating when the first cylindrical cam 53 is stopped (three first carriers 12a) is not limited to the above and other reasons may do. For example, the reason may be such for avoiding vibration to be generated by once stopping the second cylindrical cam 54 and reaccelerating the second cylindrical cam 54.

When the state illustrated in FIG. 6C is reached, the first cylindrical cam 53 ends the stop period and starts to rotate once again. Meanwhile, the second cylindrical cam 54 keeps rotating. And after going through the state illustrated in FIG. 6D, the first cylindrical cam 53 eventually comes to a state illustrated in FIG. 6E.

In the state illustrated in FIG. 6E, the position of the first carrier set that had moved past the second groove part 56b to reach the third groove 56c would be at a position 0 (position 0 on the left side) such that the first carriers 12a of this first carrier set subsequently engage with the revolving conveying parts 40 to be conveyed by the revolving conveying parts 40, as is obvious from FIG. 1.

Further, a new first carrier set subsequent to the second carrier set would reach the position 0 (position 0 on the right side) and meanwhile, the second carrier set reaches the position 1. Therefore, the state of the first carrier set in FIG. 6E would be in a state similar to the second carrier set illustrated in FIG. 6A and the state of the second carrier set in FIG. 6E would be in a state similar to the state of the first carrier set illustrated in FIG. 6A.

Thereafter, as illustrated in FIG. 5, the first cylindrical cam 53 moves in a manner similar to the movements of the second cylindrical cam 54 that are shown in FIG. 6A to FIG. 6E (from timing A to timing E), and the second cylindrical cam 54 moves in a manner similar to the movements of the first cylindrical cam 53 that are shown in FIG. 6A to FIG. 6E (from timing A to timing E).

The controller is a control unit for controlling the conveying device 10. The controller includes a CPU, a memory and the like. The CPU is an arithmetic processing unit for controlling the entire conveying device. The memory is a storage element such as an RAM, an EEPROM and the like for securing such as a region that stores programs of the CPU and work area.

Validity of Conveying Device 10 According to the Present Embodiment

As aforementioned, the conveying device 10 according to the present embodiment includes a carrier 12 to which a syringe 1 is installed, a moving path 30 where a plurality of the carriers 12 respectively move in uncoupled states, a revolving conveying part 40 that comes into contact with the carrier 12 to directly move the carrier 12 and that makes a contacted carrier that had come into contact and been moved push a plurality of carriers 12 that are positioned in front of the contacted carrier to indirectly move the plurality of carriers 12, and a cylindrical cam 52 that possesses an engaging groove 56 and that is provided to correspond to only apart of the moving path 30, wherein the cylindrical cam 52 rotates to move the plurality of the carriers 12 that are pushed by the contacted carrier to reach the cylindrical cam 52 and that are engaged with the engaging groove 56, and changes an interval between the plurality of carriers 12 as well. Therefore, a conveying device 10 that can carry out various kinds of conveying can be realized.

Conventionally, a device utilizing a chain link had been used as such a conveying device. That is, in this conveying device, a plurality of installation parts to which the objects to be conveyed are respectively installed were provided and the plurality of installation parts were coupled with a chain. Therefore, the objects to be conveyed were conveyed without changing (always keeping constant) the intervals between the installation parts (objects to be transferred). Therefore, a request to change the interval between the installation parts at only apart of the moving path could not be satisfied even when there were such requests. As an example, it is desirable to further widen the interval between the installation parts to avoid light interference caused by illumination from occurring when images of the objects to be conveyed are taken, however, such requests could not be satisfied.

Whereas, in the present embodiment, each of the plurality of carriers 12 are made to move along the moving path 30 in uncoupled states. And each of the carriers 12 are directly and indirectly moved by the revolving conveying parts 40. In other words, the basic conveying method using the revolving conveying parts 40 includes the above-mentioned first conveying method and second conveying method. And conveying with the cylindrical cam 52 is carried out at only a part of the moving path and the intervals between the plurality of carriers 12 are changed with this cylindrical cam 52. In other words, only the conveying method carried out at the part where changes to the intervals between the carriers 12 are desired is carried out by the aforementioned third method using the cylindrical cam 52.

For such reason, it is possible to appropriately satisfy a request to change the intervals, between the installation parts (i.e., carriers 12) to which the objects to be conveyed (syringes 1) are installed, at only a part of the moving path 30. Therefore, a conveying device 10 that can carry out various kinds of conveying can be realized.

Further, in the conveying device 10 according to the present embodiment, the cylindrical cams 52 are stopped when the intervals between the plurality of carriers 12 are changed.

Therefore, not only the request to change the intervals, between the installation parts (carriers 12) to which the objects to be conveyed (syringes 1) are installed, at only apart of the conveying device 30 is satisfied, but a request to stop the carriers 12 during the changing of the intervals can also be satisfied. Therefore, a conveying device 10 that can carry out further various kinds of conveying can be realized.

Further in the conveying device 10 according to the present embodiment, a first cylindrical cam 53 and a second cylindrical cam 54 that are respectively provided to correspond to predetermined positions on the moving path 30 are included as the cylindrical cam 52, the engaging grooves 56 of the first cylindrical cam 53 and the second cylindrical cam 54 are helical grooves and respectively include a first groove part 56a and a second groove part 56b that is continuous with the first groove part 56a, is positioned on a downstream side in a conveying direction with respect to the first groove part 56a and has a pitch that is different from the pitch of the first groove part 56a, a first carrier that is engageable with only the engaging groove 56 of the first cylindrical cam 53 and a second carrier 12b that is engageable with only the engaging groove 56 of the second cylindrical cam 54 are included as the carriers 12, the carriers 12 move in the moving path 30 in states where a set of a plurality of the first carriers and a set of a plurality of the second carriers are alternately lined up, the first cylindrical cam 53 stops when the interval of the first carriers 12a is changed by the first cylindrical cam 53 rotating to move the set of the plurality of the first carriers past the first groove part 56a to reach the second groove part 56b, and the second cylindrical cam 54 rotates to move the second carriers 12b that reached the first groove part 56a, when the first cylindrical cam 53 is stopped.

Therefore, a request to convey the second carriers 12b without stopping the rotation of the second cylindrical cam 54, when the first cylindrical cam 53 (first carriers 12a) is stopped can also be satisfied. Therefore, a conveying device 10 that can carry out even further various kinds of conveying can be realized.

Furthermore, the conveying device 10 according to the present embodiment includes a drive source 70 that drives the cylindrical cams 52 and the cam unit 50 that includes the cylindrical cams 52 and the drive source 70 is detachably provided to the conveying device 10.

Therefore, the cam unit 50 can be easily detached and also can be easily attached to a different location. For example, there is a case when a space to which the conveying device 10 can be placed is narrowed for some reason, and thus the route of the moving path 30 for the conveying device 10 is inevitably changed. There is also a case where the specification of the object to be transferred is changed so that the moving path 30 is extended or shortened. And in such cases, the conveying device 10 according to the present embodiment can flexibly correspond thereto. In other words, the flexibility of the conveying device can be enhanced according to the present embodiment.

Other Embodiments

Although the best mode and the like of the conveying device according to the present invention are specifically described above based on the above-described embodiments, the above-described embodiments are provided to facilitate the understanding of the present invention and is not intended to limit the present invention. It is a matter of course that the present invention can be changed and modified without departing from the gist thereof and equivalents of the present invention are also encompassed by the present invention.

Description was given exemplifying injection syringes (syringe 1) as the objects to be conveyed in the above-described embodiment, however, there is no limitation to such and the object to be conveyed can be any matter.

What is claimed is:

1. A conveying device comprising:
   a carrier to which an object to be carried is installed;
   a moving path where a plurality of the carriers respectively move in uncoupled states;
   a conveying part that comes into contact with the carrier to directly move the carrier and that makes a contacted carrier that had come into contact and been moved push a plurality of carriers that are positioned in front of the contacted carrier to indirectly move the plurality of carriers; and
   a cylindrical cam that possesses an engaging groove and that is provided to correspond to only apart of the moving path, wherein the cylindrical cam rotates to move the plurality of the carriers that are pushed by the contacted carrier to reach the cylindrical cam and that are engaged with the engaging groove, and changes an interval between the plurality of carriers as well.

2. The conveying device according to claim 1, wherein the cylindrical cam stops when the interval between the plurality of carriers is changed.

3. The conveying device according to claim 2, wherein
a first cylindrical cam and a second cylindrical cam that are respectively provided to correspond to predetermined positions on the moving path are included as the cylindrical cam,
the engaging grooves of the first cylindrical cam and the second cylindrical cam are helical grooves and respectively include a first groove part and a second groove part that is continuous with the first groove part, is positioned on a downstream side in a conveying direction with respect to the first groove part and has a pitch that is different from the pitch of the first groove part,
a first carrier that is engageable with only the engaging groove of the first cylindrical cam and a second carrier that is engageable with only the engaging groove of the second cylindrical cam are included as the carriers,
the carriers move in the moving path in states where a set of a plurality of the first carriers and a set of a plurality of the second carriers are alternately lined up,
the first cylindrical cam stops when the interval of the first carriers is changed by the first cylindrical cam rotating to move the set of the plurality of the first carriers past the first groove part to reach the second groove part, and
the second cylindrical cam rotates to move the second carriers that reached the first groove part, when the first cylindrical cam is stopped.

4. The conveying device according to claim 1 further comprises a drive source to drive the cylindrical cam and
a cam unit that includes the cylindrical cam and the drive source is detachably provided to the conveying device.

* * * * *